United States Patent
Zhang et al.

(10) Patent No.: US 10,373,022 B1
(45) Date of Patent: Aug. 6, 2019

(54) TEXT IMAGE PROCESSING USING STROKE-AWARE MAX-MIN POOLING FOR OCR SYSTEM EMPLOYING ARTIFICIAL NEURAL NETWORK

(71) Applicant: KONICA MINOLTA LABORATORY U.S.A., INC., San Mateo, CA (US)

(72) Inventors: Yongmian Zhang, Union City, CA (US); Shubham Agarwal, Belmont, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 19 days.

(21) Appl. No.: 15/908,714

(22) Filed: Feb. 28, 2018

(51) Int. Cl.
G06K 9/62 (2006.01)
G06N 3/08 (2006.01)
G06T 7/12 (2017.01)
G06K 9/00 (2006.01)
G06N 3/04 (2006.01)

(52) U.S. Cl.
CPC ....... *G06K 9/6256* (2013.01); *G06K 9/00416* (2013.01); *G06N 3/04* (2013.01); *G06N 3/08* (2013.01); *G06T 7/12* (2017.01)

(58) Field of Classification Search
CPC ............... G06K 2209/01; G06K 9/46; G06K 2009/4666; G06K 9/00442; G06K 9/00744
USPC ....................................................... 382/156
See application file for complete search history.

(56) References Cited

U.S. PATENT DOCUMENTS

| | | | | |
|---|---|---|---|---|
| 9,053,361 | B2 * | 6/2015 | Baheti | G06K 9/00456 |
| 9,984,683 | B2 * | 5/2018 | Li | G10L 15/16 |
| 2018/0137350 | A1 * | 5/2018 | Such | G06K 9/00463 |
| 2019/0095753 | A1 * | 3/2019 | Wolf | G06K 9/00442 |

OTHER PUBLICATIONS

Cho et al., "Learning phrase representations using RNN encoder-decoder for statistical machine translation", Proceedings of the Conference on Empirical Methods in Natural Language Processing, 2014, pp. 1724-1734.

Zhou et al., "Minimal gated unit for recurrent neural networks", International Journal of Automation and Computing, Jun. 2016, 13(3), pp. 226-234.

(Continued)

*Primary Examiner* — Charlotte M Baker
(74) *Attorney, Agent, or Firm* — Chen Yoshimura LLP (57) ABSTRACT

In an optical character recognition (OCR) method for digitizing printed text images using a long-short term memory (LSTM) network, text images are pre-processed using a stroke-aware max-min pooling method before being fed into the network, for both network training and OCR prediction. During training, an average stroke thickness is computed from the training dataset. Stroke-aware max-min pooling is applied to each text line image, where minimum pooling is applied if the stroke thickness of the line is greater than the average stroke thickness, while max pooling is applied if the stroke thickness is less than or equal to the average stroke thickness. The pooled images are used for network training. During prediction, stroke-aware max-min pooling is applied to each input text line image, and the pooled image is fed to the trained LSTM network to perform character recognition.

14 Claims, 4 Drawing Sheets

(56) References Cited

OTHER PUBLICATIONS

Geras et al., "Blending LSTMs into CNNs", ArXiv Preprint. arXiv:1511.06433 [cs.LG], 2015.
Fukushima et al., "Neocognitron: A new algorithm for pattern recognition tolerant of deformations and shifts in position", Pattern Recognition, 1982, vol. 15, No. 6, pp. 455-469.
Riesenhuber et al., "Hierarchical models of object recognition in cortex", Nature neuroscience, Nov. 1999, vol. 2, No. 11, pp. 1019-1025.
Lu et al., "Simplified gating in long short-term memory (LSTM) recurrent neural networks", IEEE 60th International Midwest Symposium on Circuits and Systems, 2017.
Zramdini et al., "Optical font recognition using typographical features", IEEE Transactions on pattern analysis and machine intelligence, Aug. 1998, vol. 20, No. 8, pp. 877-882.
Graves, "Generating sequences with recurrent neural networks", arXiv preprint arXiv:1308.0850, 2013.

* cited by examiner

Stroke 1 Stroke 2

| 0 | 1 | 1 | 1 | 0 | 1 | 1 | 1 | 0 |
|---|---|---|---|---|---|---|---|---|
| 0 | 1 | 1 | 1 | 0 | 1 | 1 | 1 | 0 |
| 0 | 1 | 1 | 1 | 0 | 1 | 1 | 1 | 0 |
| 0 | 1 | 1 | 1 | 0 | 1 | 1 | 1 | 0 |

Stroke 1 & 2

| 1 | 1 | 1 | 1 | 0 |
|---|---|---|---|---|
| 1 | 1 | 1 | 1 | 0 |

Fig. 2

Stroke 1 Stroke 2

| 0 | 1 | 1 | 1 | 0 | 1 | 1 | 1 | 0 |
|---|---|---|---|---|---|---|---|---|
| 0 | 1 | 1 | 1 | 0 | 1 | 1 | 1 | 0 |
| 0 | 1 | 1 | 1 | 0 | 1 | 1 | 1 | 0 |
| 0 | 1 | 1 | 1 | 0 | 1 | 1 | 1 | 0 |

Stroke 1 Stroke 2

| 0 | 1 | 0 | 1 | 0 |
|---|---|---|---|---|
| 0 | 1 | 0 | 1 | 0 |

Fig. 3 mixture from freezing too quickly .

Fig. 6

*Limited*   *Limited*   *Limited*

TEXT IMAGE PROCESSING USING STROKE-AWARE MAX-MIN POOLING FOR OCR SYSTEM EMPLOYING ARTIFICIAL NEURAL NETWORK

BACKGROUND OF THE INVENTION

Field of the Invention

This invention relates to text image processing, and in particular, it relates to a text image processing method used in conjunction with an artificial neural network to perform optical character recognition (OCR) to digitalize printed text.

Description of Related Art

There is significant interest in applying recurrent neural networks (RNN) such as long short-term memory networks (LSTM) in lingual optical character recognition (OCR) systems for text digitalization since such task can involve online processing of sequential information, e.g., a text sentence. However, LSTM is computationally complex for practical use. There have been some attempts for LSTM complexity reduction. However, the accuracy performance is often compromised by these complexity reduction techniques. More specifically, there are two major issues in applying RNN in OCR: First, due to the significant computational costs, it is difficult to deploy LSTM in large-scale or resource constrained environments, such as data centers and mobile devices, for real-time processing of a large digital transformation. Second, since the text may involve many different fonts, it is difficult to make a generalized model that can accurately recognize text of many different fonts.

To address the first issue, several techniques have been proposed which focus on reducing the number of parameters involved in the RNN, and thus reducing the computation expense. Although these techniques can achieve considerable of computation reduction, the performance accuracy degrades significantly. Because recognition accuracy is critical in the field of lingual OCR systems, these techniques that achieve computational efficiency through parameter reduction are not satisfactory. There has been relatively little effort to address the variability in fonts.

SUMMARY

Accordingly, the present invention is directed to a text image processing method that substantially obviates one or more of the problems due to limitations and disadvantages of the related art.

An object of the present invention is to provide a method which not only reduces the computation cost but also to increase recognition accuracy for an OCR system that employs a recurrent neural network.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a text character recognition method using an artificial neural network, which includes: obtaining training data containing a plurality of text line images and corresponding label data, each text line image being a binary image containing one line of printed text, the label data containing digital values representing characters contained in each text line image; for each text line image, computing a stroke thickness of the text in the text line image; computing an average stroke thickness by averaging the stroke thicknesses of all of the text line images in the training data; perform a pooling operation on each text line image of the training data to generate pre-processed text line images, including: for each text line image which has a stroke thickness greater than the average stroke thickness, performing minimum pooling on the text line image to generate a pooled image, wherein for each pixel in the pooled image, its pixel value is a minimum one of all pixel values in a corresponding pooling region of the text lime image; for each text line image which has a stroke thickness less than or equal to the average stroke thickness, performing max pooling on the text line image to generate a pooled image, wherein for each pixel in the pooled image, its pixel value is a maximum one of all pixel values in a corresponding pooling region of the text lime image; and wherein max pooling is performed on some of all of the text line images and minimum pooling is performed on some of all of the text line images, and wherein the pooled images form the pre-processed text line images; and training an untrained long-short term memory (LSTM) neural network using the pre-processed text line images and the label data to obtain a trained LSTM neural network.

Preferably, each pooling region has a size of 2×1 pixels.

The method may further include: obtaining an input text line image, the input text line image being a binary image containing one line of printed text; computing a stroke thickness of the text in the input text line image; determining that the stroke thickness is greater than the average stroke thickness; performing minimum pooling on the input text line image to generate a pooled image, wherein for each pixel in the pooled image, its pixel value is a minimum one of all pixel values in a corresponding pooling region of the input text lime image; and processing the pooled image using the trained LSTM neural network to recognize characters contained in the pooled image.

The method may further include: obtaining another input text line image, the other input text line image being a binary image containing one line of printed text; computing a stroke thickness of the text in the other input text line image; determining that the stroke thickness is less than or equal to the average stroke thickness; performing max pooling on the input text line image to generate a pooled image, wherein for each pixel in the pooled image, its pixel value is a maximum one of all pixel values in a corresponding pooling region of the input text lime image; and processing the pooled image using the trained LSTM neural network to recognize characters contained in the pooled image.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
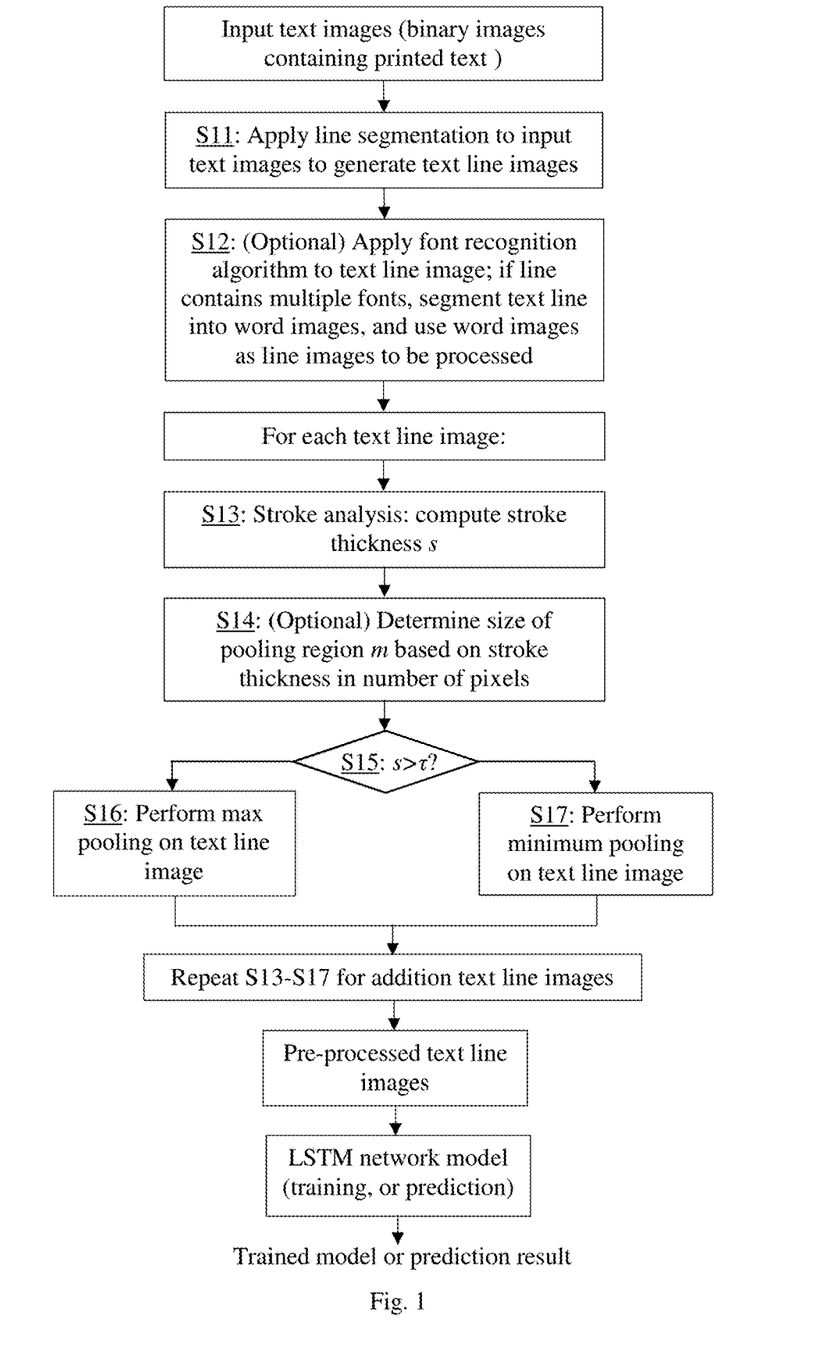
FIGS. 1, 1A and 1B schematically illustrate a text image processing method according to embodiments of the present invention.

Embodiments of the present invention provides an image processing method which pre-processes a text image before inputting the image into a recurrent neural network (RNN) for character recognition. Referring to FIG. 1 (described in more detail later), steps S11 to S17 are the image pre-processing process. The method is primarily intended to be applied to printed text presented as binary images (i.e. images where the pixel values are 0 and 1). The method does not require any modifications to the neural network model that is used for character recognition, except that it allows for fewer time steps to be used in the RNN model than would otherwise be needed. The method also reduces the size of the images that are and processed by the neural network. By applying a stroke-aware max-min pooling technique on the input text image to reduce its size, embodiments of the present invention can reduce computation complexity of the neural network model and increasing character recognition accuracy at the same time.

A recurrent neural network is a type of artificial neural network where the network nodes are connected in a cycle. A recurrent neural network may be constructed by integrating a chunk of neural network in the cell of the RNN with $x_t$ (a time series) as input to the cell and $h_t$ (a time series) as output. Long short-term memory (LSTM) blocks are a popular choice for the RNN cell in many applications, and the resulting network is referred to as an LSTM network. The cell allows information to be passed from the current time step t to the next time step t+1. Therefore, information from manu steps in the past is used to generate the output of the current step. However, more time steps involved in the time serial prediction results in higher computational cost. LSTM networks are well known in the art, and have been used to perform OCR for text digitization. See, for example, Graves, Alex. "Generating sequences with recurrent neural networks," arXiv preprint arXiv:1308.0850 (2013). One example of an LSTM network model that may be used for OCR may be obtained from https://github.com/tmbdev/clstm. This is an implementation of LSTM in c++. Based on available literature, those skilled in the art will be able to obtain to construct an RNN useful for implementing the present invention; therefore, no further detailed description of the RNN or LSTM will be provided in this disclosure. Embodiments of the present invention can be used in conjunction with any suitable RNN model, including those currently available and those that may be developed in the future.

Pooling is a method of reducing the size of a data array. Pooling maps one region of the original array to one element in the pooled array. Many artificial neural network models for visual recognition use pooling layers to perform feature pooling as a way of dimensionality reduction. Two common pooling algorithms used in visual recognition are average pooling and max pooling. In average pooling, an average of the values in each region of a feature map is calculated and used as the corresponding value of the pooled feature map:

$$f_m = \frac{1}{|y_m|} \sum_{i \in y_m} \alpha_i$$

where m denotes a region of the feature map to be pooled, $y_m$ denotes the set of locations/indices of the feature map within the region m, $\alpha_i$ denotes the value at a location i within region m, and $f_m$ denotes the value of the pooled feature map that corresponds to the region m. In max pooling, the maximum of the values in a region m of the feature map is calculated as the corresponding value of the pooled feature map:

$$f_m = \max_{i \in y_m} \alpha_i$$

Max pooling has recently gained popularity due to its better performance when applied in deep learning for image recognition.

Figure 2:
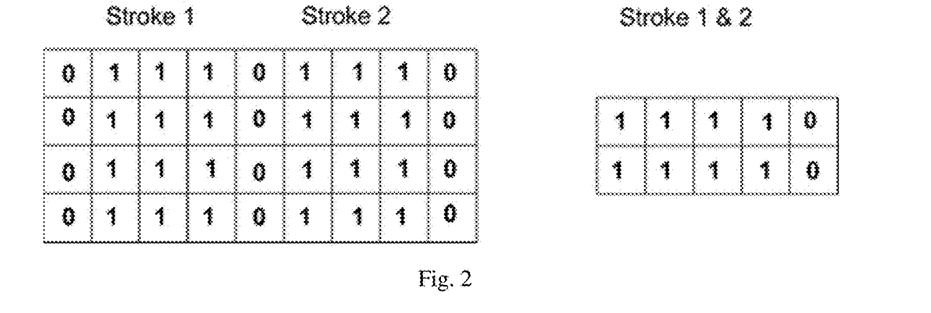
FIG. 2 schematically illustrates an example of text image after max pooling.

Embodiments of the present invention apply a pooling step to the input binary images of printed text before feeding the pooled images to an LSTM network that performs character recognition. The inventors of the present invention have observed that either max pooling or average pooing, when applied to binary images of printed text to reduce image size, often suppresses the intra-space between neighboring characters of a word, resulting in degradation of recognition performance of the LSTM network. FIG. 2 illustrates an example where max pooling suppresses the intra-space between two strokes. In FIG. 2, the original image on the left contains vertical two strokes. The pooling region is 2×2 pixels in size. In the pooled image on the right, the two strokes are merged after max pooling.

In light of the inventors' observation that neither max pooling nor average pooling performs adequately for all text fonts because both operations will suppress the intra-space between characters in a word, a new pooling method is used in embodiments of the present invention. The new pooling method prevents the intra-space of characters in a word from being suppressed, so that the structure of word is preserved.

To solve the above problem, a minimum pooling method is used, which computes the minimal value of the pixel values in an image region:

$$f_m = \min_{i \in y_m} \alpha_i$$

where m denotes a region of the image to be pooled, $y_m$ denotes the set of locations/indices of the image within the region m, $\alpha_i$ denotes the pixel value (0 or 1) at a location i within region m, and $f_m$ denotes the value of the pooled image that represents the region m.

Figure 3:
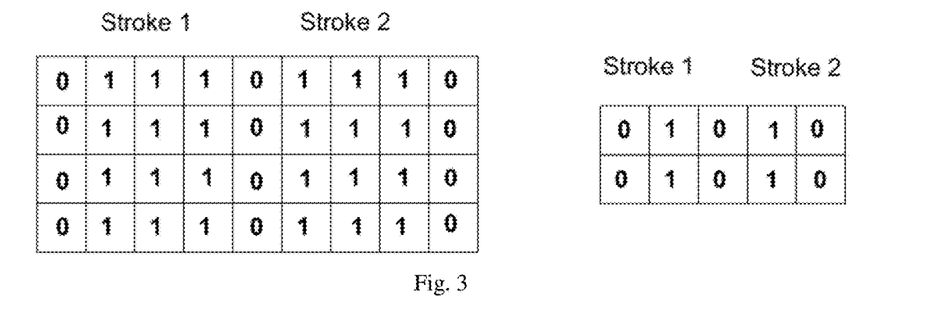
FIG. 3 schematically illustrates an example of text image after minimum pooling.

FIG. 3 illustrates how the minimum pooling method prevents the two neighboring strokes from being merged after the pooling operation. For the same example of the original image (left) as in FIG. 2, the result of minimum pooling on the right preserve the structure of the two strokes.

The pooling region is again 2×2 pixels. Although minimum pooling may erode the thickness of a stroke, it better preserves the intra-space between neighboring strokes and therefore the structure of characters and words than max or average pooling.

Although minimum pooling overcomes the drawback of max pooling when applied to binary images of printed text, it may also destroy the structure of words in some cases. For example, a stroke of a word may fade away after minimum pooling operation if the thickness of the stroke only has one pixel. To solve these problems, embodiments of the present invention provides a stroke-aware max-min pooling method, which applies either max pooling or minimum pooling to a text image region depending on the stroke thickness of the text in that region (Eq. (1)):

$$f_m \begin{cases} \min_{i \in y_m} \alpha_i, & \text{if } s > \tau \\ \max_{i \in y_m} \alpha_i, & \text{otherwise} \end{cases}$$

where m denotes a region of the image to be pooled, $y_m$ denotes the set of locations/indices of the image within the region m, $\alpha_i$ denotes the pixel value at a location i within the region m, $f_m$ denotes the value of the pooled image that corresponds to the region m, s denotes the stroke thickness of the text characters in the region m, and $\tau$ denotes an average stroke thickness calculated from a dataset that contains a large amount of printed text images in various fonts. In other words, for max pooling, the pixel value for each pixel in the pooled image is the maximum one of all pixel values in the corresponding pooling region m of the original image, and for minimum pooling, the pixel value for each pixel in the pooled image is the minimum one of all pixel values in the corresponding pooling region m of the original image.

In preferred embodiments, a line segmentation step is first applied to a page of text image to segment the page into individual lines of text. The pooling step is applied to each segmented image containing one line of text (referred to as a text line image), and the stroke thickness s is calculated for that text line. In other words, each region m in Eq. (1) is a line of text that has been segmented from a page of text image. This works well when each line contains text of one font only. As will be described in more detail later, a text line image that contains multiple fonts can be processed on a word-by-word basis.

In one implementation, the stroke thickness s for a text line is computed using the following equation (Eq. (2)):

$$s = \frac{\min_{i \in Y} \min_{j \in Xi} r_{i,j}}{h}$$

where h denotes the height of the core region of the text line as will be described later, i denotes the pixel row index in the vertical direction, Y denotes the number of horizontal scan lines (pixel rows) of the text line image, j denotes an index of a run of consecutive foreground (text) pixels in the horizontal direction within a pixel row, Xi denotes the number of runs of consecutive foreground pixels in the ith pixel row, and $r_{i,j}$ denotes the length of the run of consecutive foreground pixels (referred to as a runlength) having indices i, j. The meaning of Eq. (2) is as follows.

Figure 4:
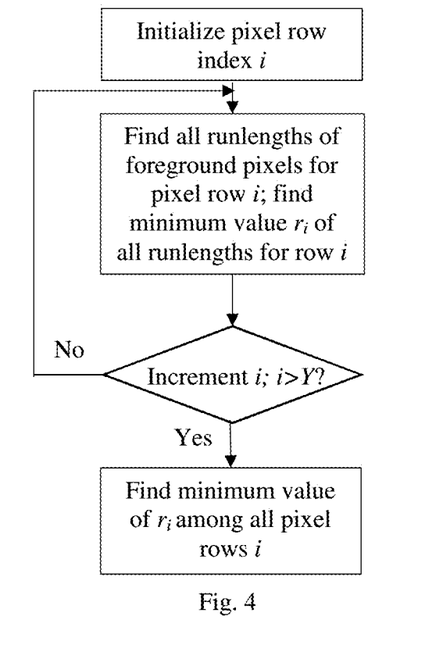
FIG. 4 schematically illustrates a method of computing stroke thickness according to an embodiment of the present invention.
Figure 5:
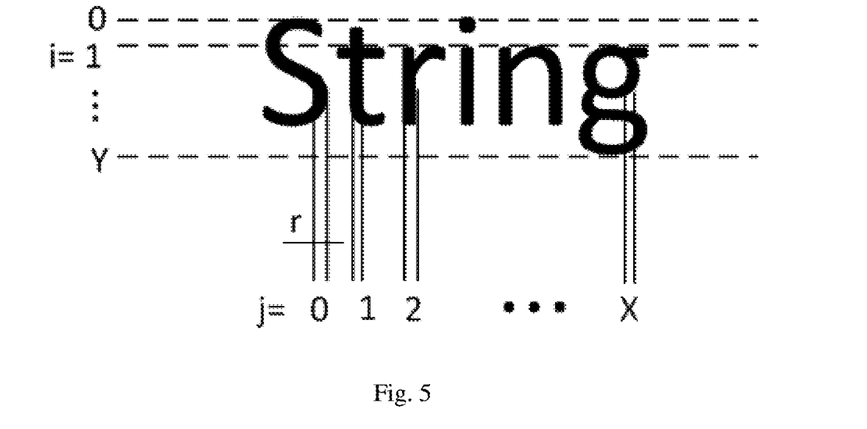
FIG. 5 schematically illustrates an example of the method of computing stroke thickness.

In each pixel row i, each run of consecutive foreground pixels in the horizontal direction corresponds to a part of a character stroke intersected by that row. At certain places, for example where the pixel row is close the top of a curved stroke (e.g. the top of "o", "s") or within a horizontal dash of some letters such as "t", the foreground runlength will be longer than the actual stroke thickness. By taking the minimum of all runlengths $r_{i,j}$ in pixel row i (denoted $r_i$), these longer foreground runlengths may be discarded. Then, the minimum of $r_i$ among all pixel rows i is calculated (however, those rows that do not have any foreground runlengths are excluded when calculating the minimum). That minimum value is then divided by the core region height h of the text to obtain the stroke thickness s. Note that the stroke thickness is a normalized value as a fraction of the core region height h of the text. FIG. 4 summarizes the process of calculating the stroke thickness. FIG. 5 illustrates an example of using this method to find the stroke thickness.

Figure 6:
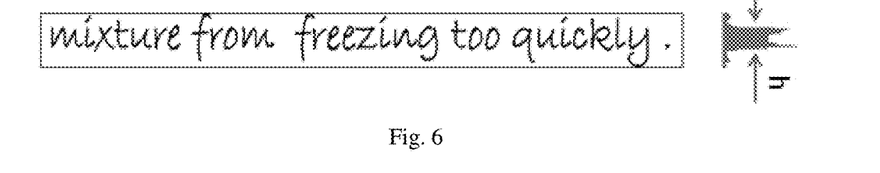
FIG. 6 schematically illustrates an example of computing a core region height of a text line.

In one embodiment, the height h of the core region of the text line is computed as follows. First, a horizontal pixel density histogram $d_i$ is generated by counting the number of foreground pixels in each pixel row. The histogram value $d_i$ for each row index i may be expressed as the fraction of the number of foreground pixels in that row over the total number of pixels in each pixel rows of the text line image. An example of a horizontal pixel density histogram is shown in FIG. 6. Then, a K means clustering computation is applied on the histogram values $d_i$ to classify them into two classes, i.e., a class of high densities and a class of low densities. The row index values i of all high density histogram values will form one or more continuous intervals along the i axis (in the vertical direction), and the length of the longest such intervals is taken as the height h of the core region of the text line. The height h of the core region serves as an approximation of the character height of the text line.

It should be noted that Eq. (2) is only an exemplary method for calculating the stroke thickness. Other suitable methods may be used.

The average stroke thickness $\tau$ is an average of the stroke thickness s values computed from a dataset that contains a large number of text line images. In case the dataset is very large, a randomly selected subset from the dataset may be used to compute $\tau$.

In preferred embodiments, the stroke-aware max-min pooling applied to the text line images uses a non-square shaped pooling region m. For example, the pooling region of 2×1 pixels, 3×1 pixels, or more generally, N×1 pixels, i.e., row-wise pooling. Using row-wise pooling, the image size is reduced only in the horizontal direction, and the size of the characters in the vertical direction remains unchanged. In other examples, the pooling region may be 3×2 pixels, 4×2 pixels, etc.

Figure 7:
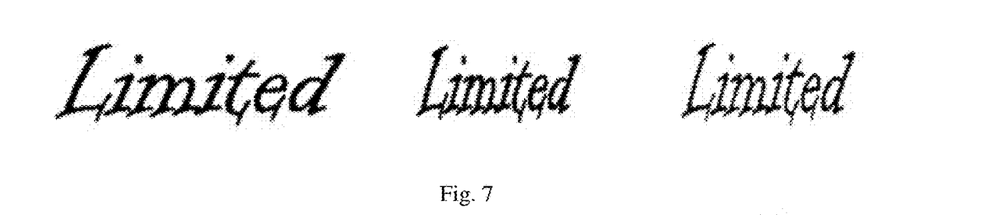
FIG. 7 schematically illustrates examples of the result of max pooling and minimum pooling on a text line.

FIG. 7 illustrates an example of the result of stroke-aware max-min pooling and compares it to the result of max pooling. The image on the left is an exemplary original text image printed in the informal roman font; the image in the middle is the pooled image after max pooling; and the image on the right is the pooled image after stroke-aware max-min pooling according to an embodiment of the present invention (in this case a minimum pooling was used based on the stroke thickness analysis). A pooling regions of 2×1 was used in both pooling methods. It can be seen that in the result using max pooling, the word structure is damaged due to the space in between characters being suppressed after max pooling. On the other hand, the result from stroke-aware max-min pooing preserves the original structure of the characters.

In some embodiments, the size of the pooling region m used for each text line image is dynamically determined based on the stroke thickness s. This can effectively equalize the stroke thickness across different fonts so that the recognition accuracy by the LSTM network can be improved. For example, depending on the stroke thickness, the pooling region size may be 2×1, 3×1, etc. In one example, a stroke thickness M in number of pixels is calculated using the method describe above (using Eq. (2) but without the division by the core region height), and a pooling region size N×1 pixels is used where N is the whole number part of M/2 or the whole number part of M/2 plus 1. Using this method, different fonts will have approximately the same stroke thickness after pooling.

As indicated earlier, processing one text line at a time works well when each line contains text of the same font. Optionally, a font detection step may be applied to the text line image first to determine whether the text line contains only one or multiple fonts; if multiple fonts are present, the text line image is segmented into multiple word images, and each word image is processed as a text line image in the same manner described above.

More specifically, this can be done in two ways. In the first method, a word segmentation step is applied to each text line to obtain word images, and a font recognition algorithm is applied to each word image to determine the font for the word. If at any point it is determined that line contains multiple fonts, the pooling step is applied to each word image separately. Font recognition algorithms are known. For example, Zramdini, Abdelwahab, and Rolf Ingold. "Optical font recognition using typographical features." IEEE Transactions on pattern analysis and machine intelligence 20.8 (1998): 877-882, describes a font recognition algorithm which may be used in this step.

In the second method, without first segmenting the text line into words, a font recognition algorithm may be applied to the text line to detect whether the line contains multiple fonts. If it does, the line is segmented into word images and pooling is applied to each word image separately; if it does not, pooling is applied to the entire line.

FIG. 1 summarizes the text image processing method according to embodiments of the present invention. Details of the steps have been described above. The input to the process is binary images of printed text. First, line segmentation is applied to the input images to generate text line images (step S11). This step is unnecessary if the input images have already been segmented into text lines. For each text line image, an optional step (step S12) is performed to determine whether the text line contains only one font or multiple fonts, and if the line contain multiple fonts, to further segment the text line image into multiple word images. Each such word image will be treated as a text line image in the subsequent steps. Step S12 is optional; when it is omitted, each line is processed as a text line image without determining whether it contains only one or multiple fonts.

For each text line image, a stroke thickness s of the characters is computed (step S13). Based on the stroke thickness measured in the number of pixels, a pooling region size m is determined (step S14). Step S14 is optional and may be omitted in some embodiments; when it is omitted, a predetermined size is used for the pooling region m.

Then, stroke-aware max-min pooling is applied to the text line image (steps S15, S16 and S17) to generate a pre-processed text line image. The value τ (average stroke thickness) used in the determination in step S15 has been previously calculated using a dataset of binary printed text images. Steps S13-S17 are repeated for each text line image.

The pre-processed text line images are inputted to the LSTM network model to either train the network model or perform character recognition (prediction). As is generally known in the art of neural networks, training of a network model includes feeding a large amount of labeled training data, in this case pre-processed text line images labeled with digital values representing the characters contained in the text line images, to the network model to compute the weights of the network model. Performing prediction includes inputting the data to be processed, in this case text line images to be recognized, into the network to obtain prediction output, in this case the digital values of the characters in the text line images. As noted earlier, embodiments of the present invention use pre-processed text line images, as opposed to the original input text images, as input to the LSTM network model for both training and prediction, but do not require any modification of the LSTM network or its training algorithm. The number of time steps for the LSTM model is equal to the number of columns in the input image. Therefore, after applying max-min pooling, the number of time steps for the LSTM model is reduced by half when the pooling region is 2×1 pixels.

Figure 1A:
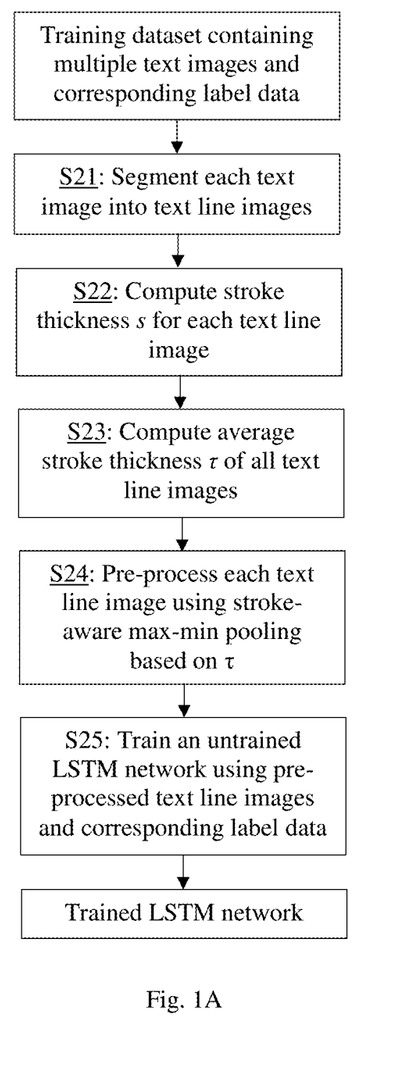
Figure 1B:
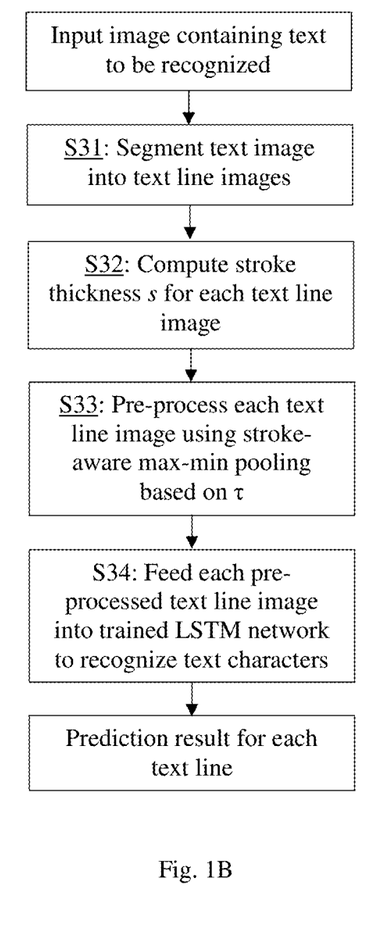

More specifically, in the training stage (FIG. 1A), a training dataset containing multiple text images and corresponding label data is provided (it may be the whole or a subset of a dataset, and should contain all fonts that the network model is expected to recognize), the images are segment into multiple text line images (step S21), and stroke analysis (same as step S13) is applied to the each text line images to compute the stroke thickness (step S22), and the average stroke thickness τ is computed from all text line images (step S23). Stroke-aware max-min pooling based on the computed τ value (same as steps S15-S17) is then applied to each text line image (step S24) to generate pre-processed training dataset. The pre-processed training dataset is used to train an untrained LSTM network model. In the prediction stage (FIG. 1B), an input text image containing text to be recognized is segmented into text line images (step S31), the stroke thickness is computed for each text line image (step S32), and the text line image is pre-processed using stroke-aware max-min pooling (step S33, same as steps S15-S17). The pre-processed text line image is then inputted into the trained LSTM network model which outputs the recognition result (step S34).

In the prediction stage, it is possible that each page of text image invokes only max pooling or only minimum pooling depending on the font used in that page (i.e. the stroke thickness relative to τ); however, because the τ value has been computed from the training dataset which contains a large number of fonts, the overall performance of the trained LSTM network for all fonts is improved.

The inventors of the present invention have performed tests using a dataset that contained 30 commonly used fonts. In terms of recognition accuracy, the stroke-aware max-min pooling provided a 9% improvement in overall recognition accuracy compared with max pooling and 8% improvement compared with original input without using any pooling methods. Further, using stroke-aware mas-min pooling reduced the computation time for the overall digitizing process by about 50% on average as compared to not using any pooling. This reduction in computation time significantly outperforms many existing approaches of LSTM parameter compression. Moreover, using stroke-aware mas-min pooling reduced the variance of recognition accuracy among multiple fonts. Although, for some fonts using stroke-aware max-min pooling resulted in slightly lower accuracy, overall accuracy was significantly improved.

In summary, unlike in many conventional approaches where accuracy performance is always compromised by complexity reduction, the stroke-aware max-min pooling method according to embodiments of the present invention not only increases classification accuracy, but also significantly reduces computational cost through reducing the number of time steps for LSTM, for example by 50% when the pooling region is 2×1 pixels.

The pooling method according to embodiments of the present invention has the following advantages. Unlike traditional methods (e.g. average and max pooling), this pooling method is guided by font stroke of a given text line, which can better equalize the similarities between different fonts to improve classification accuracy. Unlike traditional pooling which uses square pooling regions, this pooling method uses non-square pooling regions which can better preserve the discriminative features of characters in the vertical direction. The pooling method can result in fewer time steps needed in the LSTM time series The stroke-aware max-min pooling method may be implemented in a data processing system such as one or more computers. Each computer may comprise a processor, a memory or storage device (e.g. hard disk drive, flash memory), and internal memories (e.g. a RAM). The storage device stores computer-readable program code, which can be read out to the RAM and executed by the processor to carry out the methods. The stroke-aware max-min pooling steps and the RNN model may be implemented on the same computer or different computers. In practice, artificial neural network models are often implemented using specialized processors such as GPU (graphics processing unit) clusters.

In one aspect, the invention is a method carried out by a data processing system. In another aspect, the invention is a computer program product embodied in computer usable non-transitory memory having a computer readable program code embedded therein for controlling a data processing apparatus to carry out the method. In another aspect, the invention is embodied in a data processing system.

It will be apparent to those skilled in the art that various modification and variations can be made in the text image processing method and related apparatus of the present invention without departing from the spirit or scope of the invention. Thus, it is intended that the present invention cover modifications and variations that come within the scope of the appended claims and their equivalents.

What is claimed is:

1. A text character recognition method using an artificial neural network, comprising:
   obtaining training data containing a plurality of text line images and corresponding label data, each text line image being a binary image containing one line of printed text, the label data containing digital values representing characters contained in each text line image;
   for each text line image, computing a stroke thickness of the text in the text line image;
   computing an average stroke thickness by averaging the stroke thicknesses of all of the text line images in the training data;
   perform a pooling operation on each text line image of the training data to generate pre-processed text line images, including:
      for each text line image which has a stroke thickness greater than the average stroke thickness, performing minimum pooling on the text line image to generate a pooled image, wherein for each pixel in the pooled image, its pixel value is a minimum one of all pixel values in a corresponding pooling region of the text lime image;
      for each text line image which has a stroke thickness less than or equal to the average stroke thickness, performing max pooling on the text line image to generate a pooled image, wherein for each pixel in the pooled image, its pixel value is a maximum one of all pixel values in a corresponding pooling region of the text lime image; and
      wherein max pooling is performed on some of all of the text line images and minimum pooling is performed on some of all of the text line images, and wherein the pooled images form the pre-processed text line images; and
   training an untrained long-short term memory (LSTM) neural network using the pre-processed text line images and the label data to obtain a trained LSTM neural network.

2. The method of claim 1, wherein the step of obtaining training data includes:
   obtaining a plurality of text images, each text image being a binary image containing a plurality of lines of printed text; and
   segmenting each text image into a plurality of text line images, each text line image containing one line of printed text.

3. The method of claim 1, wherein each pooling region has a size of 2×1 pixels.

4. The method of claim 1, further comprising, for each text line image, after computing the stroke thickness and before performing the pooling operation, determining a size of each pooling region based on the stroke thickness measured in a number of pixels.

5. The method of claim 1, further comprising:
   obtaining an input text line image, the input text line image being a binary image containing one line of printed text;
   computing a stroke thickness of the text in the input text line image;
   determining that the stroke thickness is greater than the average stroke thickness;
   performing minimum pooling on the input text line image to generate a pooled image, wherein for each pixel in the pooled image, its pixel value is a minimum one of all pixel values in a corresponding pooling region of the input text lime image; and
   processing the pooled image using the trained LSTM neural network to recognize characters contained in the pooled image.

6. The method of claim 5, further comprising:
   obtaining another input text line image, the other input text line image being a binary image containing one line of printed text;
   computing a stroke thickness of the text in the other input text line image;
   determining that the stroke thickness is less than or equal to the average stroke thickness;
   performing max pooling on the input text line image to generate a pooled image, wherein for each pixel in the pooled image, its pixel value is a maximum one of all pixel values in a corresponding pooling region of the input text lime image; and
   processing the pooled image using the trained LSTM neural network to recognize characters contained in the pooled image.

7. The method of claim 6, further comprising:
for each text line image of the training data, after computing the stroke thickness and before performing the pooling operation, determining, based on the stroke thickness measured in a number of pixels, a size of each pooling region to be used in the pooling operation on the text line image;
for the input text line image, after computing the stroke thickness and before performing the pooling operation, determining, based on the stroke thickness measured in a number of pixels, a size of each pooling region to be used in the pooling operation on the input text line image; and
for the other input text line image, after computing the stroke thickness and before performing the pooling operation, determining, based on the stroke thickness measured in a number of pixels, a size of each pooling region to be used in the pooling operation on the other text line image.

8. A computer program product comprising a non-transitory computer readable memory device having a computer readable program code embedded therein for controlling a data processing apparatus, the computer readable program code configured to cause the data processing apparatus to execute a text character recognition process, the process comprising:
obtaining training data containing a plurality of text line images and corresponding label data, each text line image being a binary image containing one line of printed text, the label data containing digital values representing characters contained in each text line image;
for each text line image, computing a stroke thickness of the text in the text line image;
computing an average stroke thickness by averaging the stroke thicknesses of all of the text line images in the training data;
perform a pooling operation on each text line image of the training data to generate pre-processed text line images, including:
for each text line image which has a stroke thickness greater than the average stroke thickness, performing minimum pooling on the text line image to generate a pooled image, wherein for each pixel in the pooled image, its pixel value is a minimum one of all pixel values in a corresponding pooling region of the text lime image;
for each text line image which has a stroke thickness less than or equal to the average stroke thickness, performing max pooling on the text line image to generate a pooled image, wherein for each pixel in the pooled image, its pixel value is a maximum one of all pixel values in a corresponding pooling region of the text lime image; and
wherein max pooling is performed on some of all of the text line images and minimum pooling is performed on some of all of the text line images, and wherein the pooled images form the pre-processed text line images; and
training an untrained long-short term memory (LSTM) neural network using the pre-processed text line images and the label data to obtain a trained LSTM neural network.

9. The computer program product of claim 8, wherein the step of obtaining training data includes:
obtaining a plurality of text images, each text image being a binary image containing a plurality of lines of printed text; and
segmenting each text image into a plurality of text line images, each text line image containing one line of printed text.

10. The computer program product of claim 8, wherein each pooling region has a size of 2×1 pixels.

11. The computer program product of claim 8, wherein the process further comprises, for each text line image, after computing the stroke thickness and before performing the pooling operation, determining a size of each pooling region based on the stroke thickness measured in a number of pixels.

12. The computer program product of claim 8, wherein the process further comprises:
obtaining an input text line image, the input text line image being a binary image containing one line of printed text;
computing a stroke thickness of the text in the input text line image;
determining that the stroke thickness is greater than the average stroke thickness;
performing minimum pooling on the input text line image to generate a pooled image, wherein for each pixel in the pooled image, its pixel value is a minimum one of all pixel values in a corresponding pooling region of the input text lime image; and
feeding the pooled image into the trained LSTM neural network to recognize characters contained in the pooled image.

13. The computer program product of claim 12, wherein the process further comprises:
obtaining another input text line image, the other input text line image being a binary image containing one line of printed text;
computing a stroke thickness of the text in the other input text line image;
determining that the stroke thickness is less than or equal to the average stroke thickness;
performing max pooling on the input text line image to generate a pooled image, wherein for each pixel in the pooled image, its pixel value is a maximum one of all pixel values in a corresponding pooling region of the input text lime image; and
feeding the pooled image into the trained LSTM neural network to recognize characters contained in the pooled image.

14. The computer program product of claim 13, wherein the process further comprises:
for each text line image of the training data, after computing the stroke thickness and before performing the pooling operation, determining, based on the stroke thickness measured in a number of pixels, a size of each pooling region to be used in the pooling operation on the text line image;
for the input text line image, after computing the stroke thickness and before performing the pooling operation, determining, based on the stroke thickness measured in a number of pixels, a size of each pooling region to be used in the pooling operation on the input text line image; and
for the other input text line image, after computing the stroke thickness and before performing the pooling operation, determining, based on the stroke thickness measured in a number of pixels, a size of each pooling region to be used in the pooling operation on the other text line image.

\* \* \* \* \*